(12) United States Patent
Marotzke et al.

(10) Patent No.: US 6,171,228 B1
(45) Date of Patent: Jan. 9, 2001

(54) METHOD FOR FOLDING AN AIRBAG (75) Inventors: Thomas Marotzke, Bergfelde; Tobias Pausch, Berlin, both of (DE)

(73) Assignee: Petri AG, Aschaffenburg (DE)

( * ) Notice: Under 35 U.S.C. 154(b), the term of this patent shall be extended for 0 days.

(21) Appl. No.: 09/043,056

(22) PCT Filed: Jul. 4, 1996

(86) PCT No.: PCT/DE96/01247

§ 371 Date: Mar. 11, 1998

§ 102(e) Date: Mar. 11, 1998

(87) PCT Pub. No.: WO97/10123

PCT Pub. Date: Mar. 20, 1997

(30) Foreign Application Priority Data

Sep. 12, 1995 (DE) .............................................. 195 35 565

(51) Int. Cl.[7] .................................................. B60R 21/16
(52) U.S. Cl. ........................ 493/405; 493/243; 493/451; 493/458; 493/940; 280/728.1; 280/743.1
(58) Field of Search .................... 493/405, 450, 493/451, 458, 916, 940, 243, 244; 280/728.1, 743.1

(56) References Cited

U.S. PATENT DOCUMENTS

| 2,709,950 | * | 6/1955 | Foster et al. ........................ 493/451 |
| 3,876,272 | | 4/1975 | Tsutsumi et al. . |
| 3,907,330 | | 9/1975 | Kondo et al. . |
| 3,945,665 | | 3/1976 | Tsutsumi et al. . |
| 4,173,356 | | 11/1979 | Ross . |
| 4,430,772 | * | 2/1984 | Michel et al. ......................... 53/576 |
| 5,162,035 | | 11/1992 | Baker . |
| 5,300,011 | * | 4/1994 | Budde et al. ........................ 493/405 |
| 5,360,387 | | 11/1994 | Baker . |
| 5,456,651 | * | 10/1995 | Baker et al. ........................ 493/405 |
| 5,690,358 | | 11/1997 | Marotzke . |
| 5,782,737 | * | 7/1998 | Warner ................................ 493/405 |

FOREIGN PATENT DOCUMENTS

| 2335798 | 8/1974 | (DE) . |
| 9101099 | 7/1992 | (DE) . |
| 4422276 | 12/1994 | (DE) . |
| 0 443 485 B1 | 8/1991 | (EP) . |
| 0443485 | 8/1991 | (EP) . |
| 1438032 | 6/1976 | (GB) . |
| 2192841 | 1/1988 | (GB) . |

* cited by examiner

*Primary Examiner*—Peter Vo
*Assistant Examiner*—C. Harmon
(74) *Attorney, Agent, or Firm*—Christie, Parker & Hale, LLP (57) ABSTRACT

A method and device for folding an airbag having a inner main fold and an outer main fold in a folded state. The airbag is fixed to a working surface, extended along a longitudinal axis away from the working surface, and fixed in the area of the inner or outer main fold. The airbag is then expanded, or contracted, to form the outer or inner main fold, respectively, and then compressed toward the working surface. A shaping body is preferably inserted into the airbag through an inflation opening to extend the airbag so that a folding element may activated to retain the airbag against the shaping body to form the inner or outer main fold.

13 Claims, 8 Drawing Sheets

METHOD FOR FOLDING AN AIRBAG

BACKGROUND OF THE INVENTION

The present invention relates generally to airbags, and more particularly to a method and apparatus for folding an airbag.

From German Patent No. DE 44 22 276 A1 an airbag is known for an airbag module where the collapsed airbag has main folds which run at least in part along closed paths around an imaginary center on the substantially empty spread-out airbag. The closed main folds preferably describe circular paths or ellipses of slight eccentricity. Secondary folds are also provided which arise naturally during collapsing of the airbag.

This path of the main folds has the advantage that the folded airbag can open very quickly and easily. Particularly during the unfolding of such an airbag there is not the danger that the inner pressure produced in partial areas of the airbag will impede the opening of further folds. This airbag can thereby be used for driver, passenger and side airbags. The drawback with this folding is that the expense for folding is considerable particularly if the folding is carried out mechanically.

Furthermore from U.S. Pat. No. 4,173,356 an airbag is known which is folded concertina-like in the direction of the blow-in mouth. The main folds thereby run along parallel straight lines. An airbag thus folded can unfold quickly and simply wherein it is only suitable for passenger or side airbags in this type of folding owing to its elongated shape which is essential for a sufficient volume. It could only be used as a driver airbag if the ends are turned in. There is then however the danger that the inner pressure impedes the opening of some folds.

From U.S. Pat. No. 3,876,272 an airbag is known which has several inner and outer main folds relative to a longitudinal axis. An airbag folded in this way can also unfold rapidly and quickly.

The objective of the invention is therefore to reduce the expense for folding in the case of a universal airbag which is folded so that the inner pressure does not impede the opening of the folds.

SUMMARY OF THE INVENTION

With a method for folding an airbag which has in the folded state at least one inner and one outer main fold wherein the latter runs at a greater distance from the longitudinal axis than the inner main fold, according to the invention the clamped airbag is pre-shaped so that it extends in the direction of a longitudinal axis on the sleeve face of the inner main fold or main folds provided. The airbag is then fixed in the area of the inner main fold or inner main folds provided and is pressed or drawn outwards in the area of the outer main fold or main folds provided. The airbag is then compressed in the direction of its clamping point.

With this method first the position of the sleeve face of the inner main fold or main folds is fixed. The outer folds are then formed by sliding or drawing to the outside the parts of the airbag not fixed there. The advantage is that the folding process can be readily mechanized and automated whereby the technical expense is reduced compared to known folding. Rapid folding is possible. This type of folding allows also a favorable storage of the gas generator which can also be inserted afterwards.

An alternative to the aforesaid method exists where the clamped airbag is pre-formed so that it extends in the direction of a longitudinal axis on the sleeve face of the outer main fold or main folds provided, that the airbag is then fixed in the area of the outer main fold or folds provided and pressed or drawn inwards in the area of the inner main fold or main folds and that the airbag is then compressed in the direction of its clamping point.

With this method thus first the position of the sleeve face of the outer main fold or main folds is fixed. The inner main fold or inner main folds are then formed by sliding or drawing inwards the parts of the airbag not fixed there.

In order to carry out the folding method the airbag is preferably clamped in the area of its blow-in mouth or inflation opening wherein the longitudinal axis about which the folding is carried out then runs approximately perpendicularly through the blow-in mouth.

The shaping and temporary fixing of the airbag in the area of the outer main fold or main folds provided is preferably carried out by means of compressed air and the shaping and fixing of the airbag in the area of the proposed inner main fold or main folds is preferably carried out by means of mechanical aids.

In a preferred embodiment the method is designed so that the airbag prefitted on a generator support plate is tensioned over one or more hollow cylinders until it adjoins same and is completely stretched. Folding elements are then fitted on the airbag in the area of the inner main fold or main folds provided. These folding elements fix the airbag at the points where the inner main fold or the inner main folds are provided. The hollow cylinder is then biased with compressed air wherein the airbag is pressed outwards at the non-fixed points. The outer main folds are then formed in these sections which have been pressed to the outside. These steps mentioned up until now substantially determine the sleeve faces in which lie the inner and outer main folds.

At the end of these aforementioned steps the hollow cylinder is then pushed with the folding elements in the direction of the generator support plate whereby the compressed air can escape. In this method step the final folding of the airbag takes place. At the end of the folding process the folding elements and the hollow cylinder are removed and then a cover cap and generator are fitted.

A device for carrying out the method is characterized in that a shaping body is provided for pre-forming the airbag and that displaceable folding elements are provided in a ring around these shaping bodies at a distance from the inner main fold or main folds provided across the longitudinal axis of the shaping body.

In a preferred embodiment a hollow body is provided which has through openings on its sleeve face and can be attached to a compressed air source. Compressed air is blown in through the openings into the airbag and this is then inflated in the areas of the outer main fold or main folds provided.

In a preferred embodiment a hollow cylinder is provided as a hollow body.

A further embodiment proposes that the shaping body is mounted in an underpressure or vacuum chamber. In this case the areas of the airbag in which the outer main fold or main folds are provided are then drawn outwards.

In a further embodiment a shaping body is provided which has on its sleeve face or outer surface grooves for blowing in compressed air or sucking out air. In this embodiment the shaping body need not be a hollow body for supplying compressed air into the airbag.

Folding plates are preferably provided as folding elements and have a forked section which matches the path of the sleeve face of the hollow body.

If several inner and outer main folds are provided the parts of the fork lie in one plane.

If only one inner and one outer main fold are provided the forked section of the folding plate has mutually restricted parts. These restricted parts form with an off-set arrangement of the folding plates a spiral shaped line which corresponds to the inner main folding line .

Cables or tongs can also be used as folding elements.

BRIEF DESCRIPTION OF THE DRAWINGS

The invention will now be explained in an embodiment with reference to the drawings in which:

FIGS. 18a,b show a device for folding according to FIG. 18 by means of circumferential loops.

DETAILED DESCRIPTION OF THE INVENTION

Figure 1:
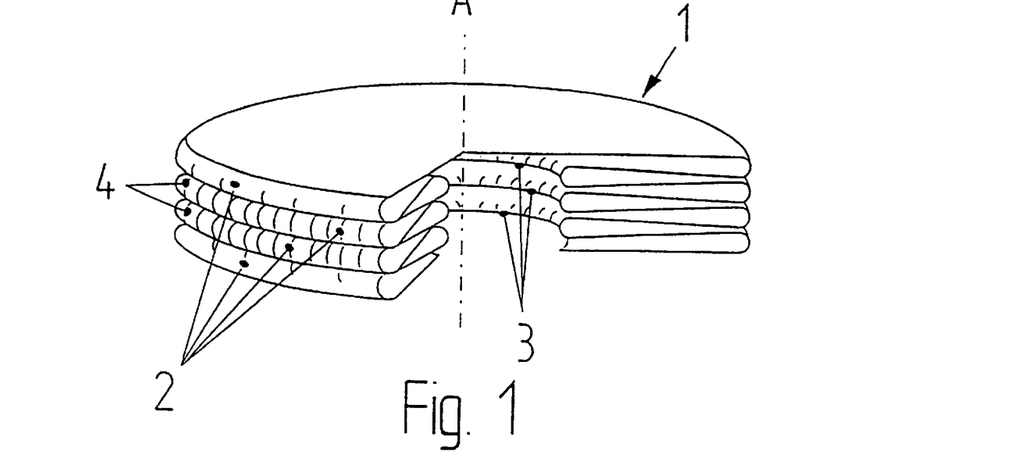
FIG. 1 is a sectional perspective view of a folded airbag.
Figure 2:
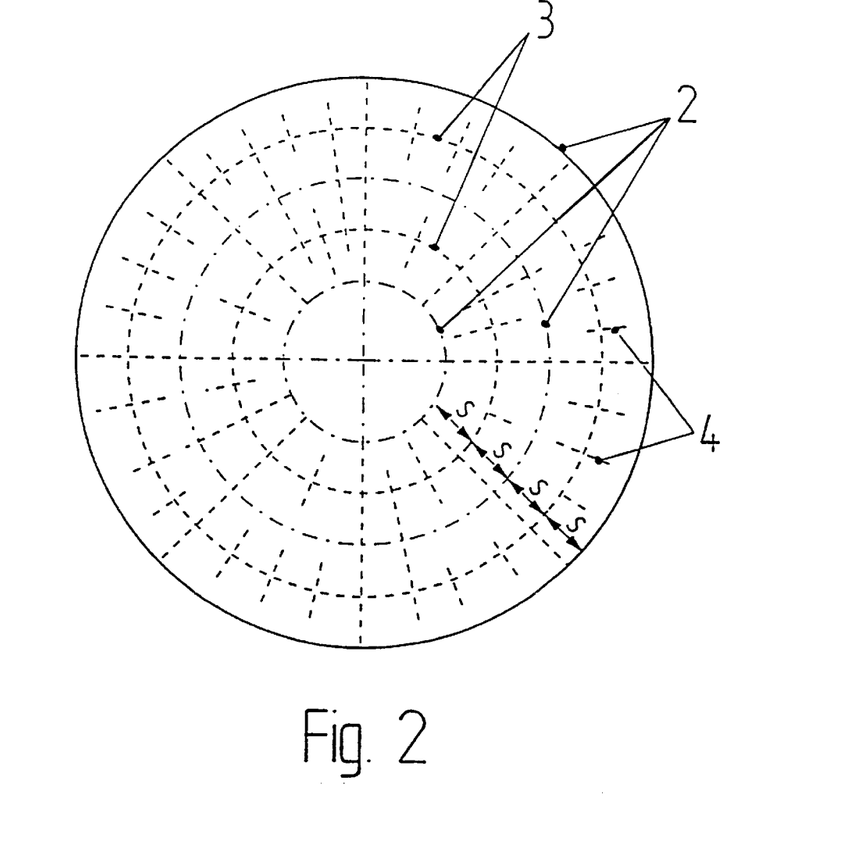
FIG. 2 is a plan view of the expanded airbag with the main folds provided.
Figure 3:
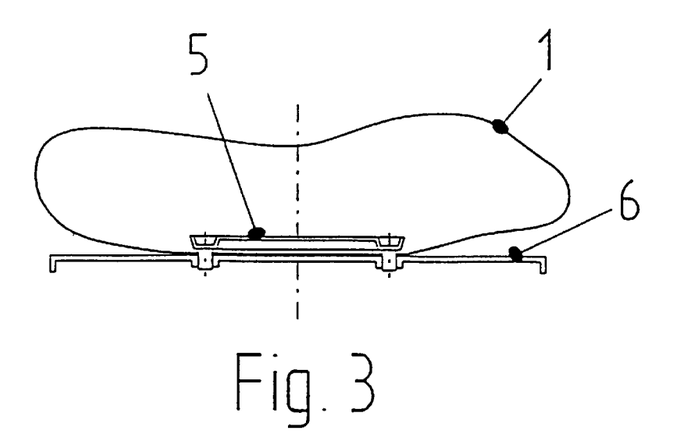
FIGS. 3–8 show the development of the folding process.
Figure 4:
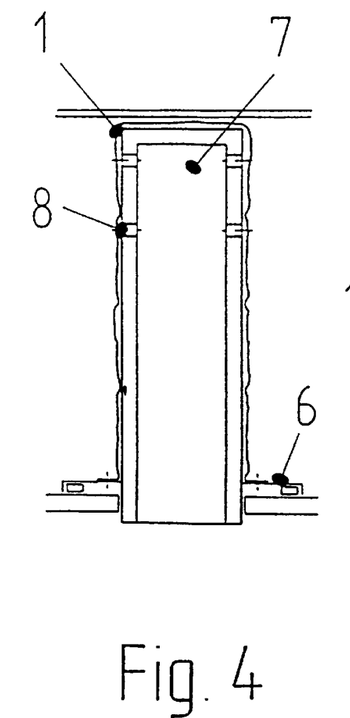
Figure 5:
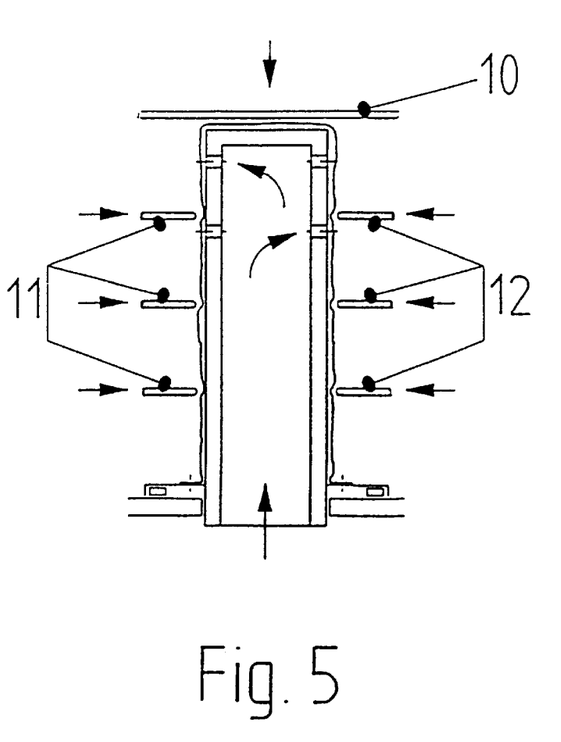

FIG. 1 is a perspective view of an airbag folded according to the invention which is folded in the direction of a longitudinal axis A. With this type of folding outer main folds 2 and inner main folds 3 are provided which follow each other alternately. The folds lie at a spacing s from each other. FIG. 2 shows the spread-out airbag with the outer and inner main folds 2 and 3 provided therein. It can be seen that the main folds provided on the spread out airbag lie on closed paths of different diameter. Since the outer and inner main folds at the end of folding lie on paths with substantially the same diameter, during folding of the airbag secondary folds 4 are also formed in addition to the main folds deliberately provided and these secondary folds are formed naturally and arbitrarily, but in practice run approximately at right angles to the main folds. These secondary folds 4 are formed during folding of the airbag most markedly at the point where in order to achieve the uniform diameter of the paths on which the main folds lie, the most material has to be gathered in. As shown in FIG. 2 the secondary folds extend in this area from the outer main folds to the inner main folds.

Figure 9:
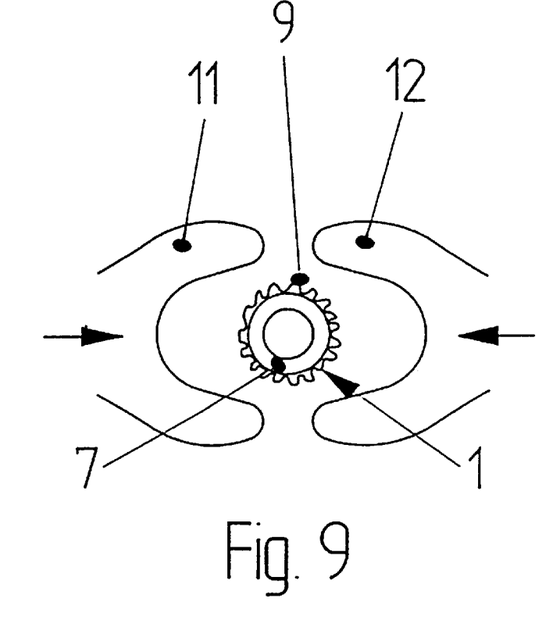
FIG. 9 is a plan view of the folding plates.

As shown in FIGS. 3 to 8 the folding process takes place in the illustrated embodiment so that the airbag is prefitted on a general support plate or working surface 6 in the area of its blow-in mouth or inflation opening 5. Then a shaping body or hollow cylinder 7 is inserted through this mouth 5 into the airbag 1. This hollow cylinder has roughly the diameter of the gas generator as well as on its circumference numerous through openings 8 which lie in particular in planes of the outer main folds provided. The hollow cylinder is inserted so far into the airbag until the latter is completely stretched. The airbag then adjoins the hollow cylinder. As a result of the round geometry of the airbag 1 illustrated in FIG. 2 longitudinal folds 9 are formed (FIG. 9).

Figure 10:
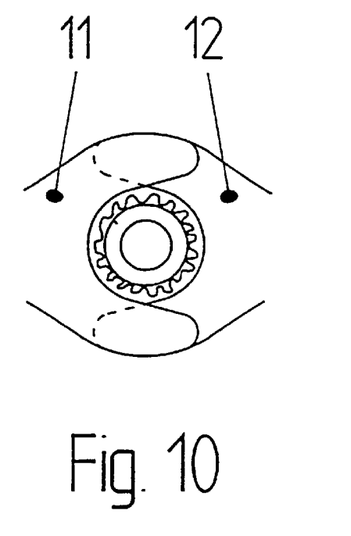
FIG. 10 shows the folding plates according to FIG. 9 in their work position.

In a next step a pressure plate 10 is placed against the airbag in the area of the end face of the hollow cylinder. Furthermore folding plates 11, 12 are placed against the airbag 1 in the planes of the inner main folds 3 provided. The folding plates 11, 12 have the forked shape shown in FIG. 9 and such a spacing in the vertical direction that as shown in FIG. 10 they can be pushed one over the other and engage on all sides round the airbag tensioned around the hollow cylinder 7.

Figure 6:
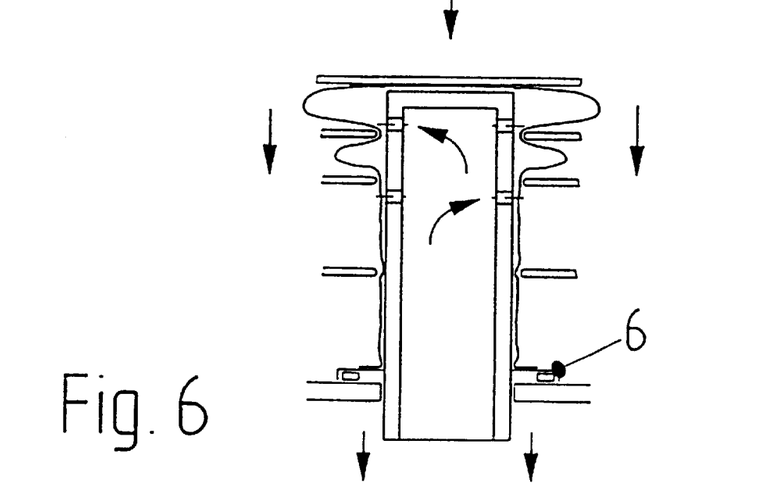

The hollow cylinder is then biased with compressed air. This enters the airbag 1 from the through openings 8 in its outer surface and presses the bag away from the outer surface hollow cylinder in the area of the outer main folds provided, as can be seen in FIG. 6. The hollow cylinder 7 is then pushed together with the folding plates 11, 12 and pressure plate 10 towards the generator support plate 6. The folding of the airbag 1 is thereby carried out whereby the site of the main folds is fixed through the position of the folding plates 11, 12 and through the compressed air. During folding the compressed air is let out of the airbag until the folding process is possible.

Figure 7:
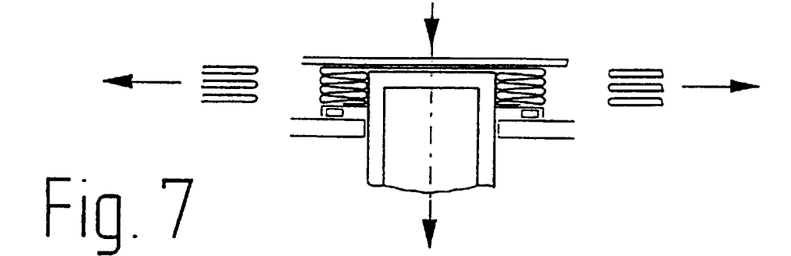
Figure 8:
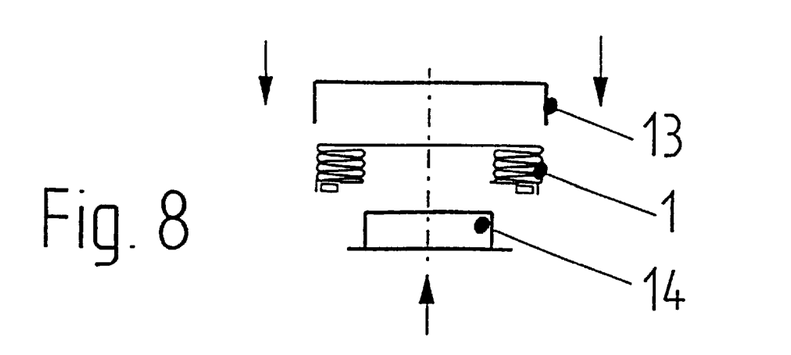

After folding has been completed as shown in FIG. 7, the folding plates 11, 12 , pressure plate 10 and hollow cylinder 7 are removed. A cover cap 13 and gas generator 14 can then be fitted.

Figures 11, 12:
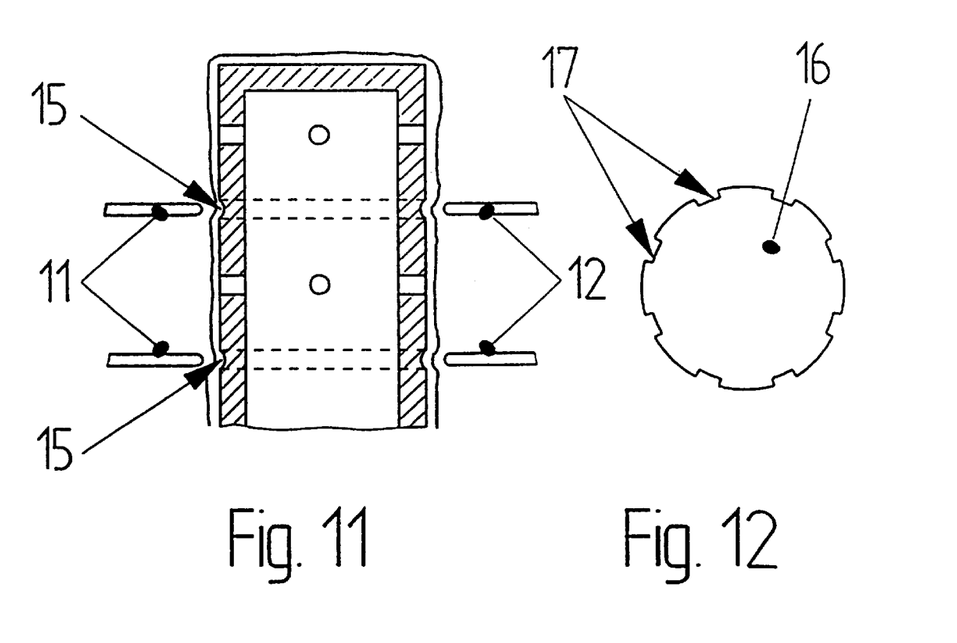
FIG. 11 is a longitudinal sectional view through a body for pre-forming the airbag.
FIG. 12 is a cross-section through a shaping body with grooves for pre-forming the airbag.

The hollow cylinder shown in FIG. 11 has on its circumference in the area of the folding plates 11, 12 circumferential notches 15 into which can engage the folding plates. During insertion of compressed air into the airbag improved fixing of the airbag is thereby reached in the area of the folding plates.

FIG. 12 shows a shaping cylinder 16 which can be used instead of the shaping cylinder 7. This shaping cylinder which can be formed equally as a hollow body or solid body, has grooves 17 spread out over its circumference for supplying compressed air and running in the direction of the longitudinal axis of the shaping cylinder.

Figure 13A:
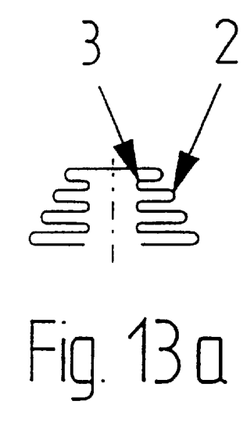
FIGS. 13a–c show airbags folded in different shape.
Figure 13B:
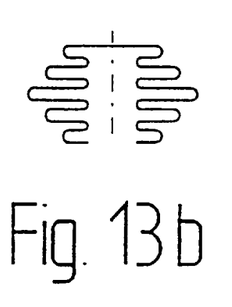
Figure 13C:
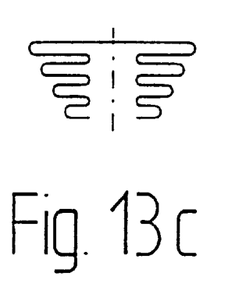

FIGS. 13a to 13c show folds of different size which can be achieved by means of folding plates of the type previously described but not shown and which are arranged at different intervals around a cylindrical shaping body. The spaces between the folding plates determine the size of the folds. In order to reach the path of the outer main folds 2 according to FIG. 13a the folding plates must have a smaller spacing starting from the lower area of the shaping body upwards. For the folding according to FIG. 13b the distance between the folding plates is greatest in the middle of the shaping body and decreases from top to bottom. With the folding according to FIG. 13c the distance between the folding plates increases from bottom to top.

Figure 14A:
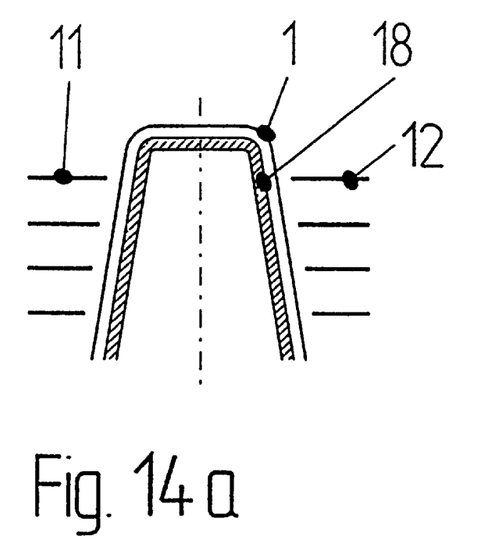
FIGS. 14a,b show a conical shaping body and the folding of the airbag which can be achieved therewith.
Figure 14B:
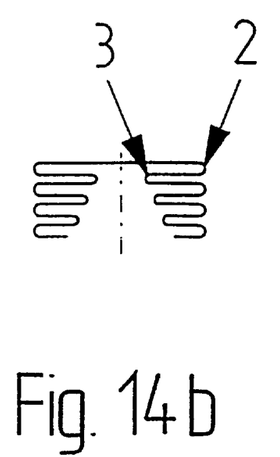

In FIG. 14a a conical shaping body 18 is shown with an airbag 1 which is to be folded, as well as the folding plates 11,12. The folding plates are arranged from bottom to top in an increasingly larger spacing so that the airbag is formed in the manner shown in FIG. 14b where the folds become greater from bottom to top. Whilst the inner main folds 3 lie on an imaginary conical sleeve the outer main folds 2 run on an imaginary cylinder sleeve.

Figure 15A:
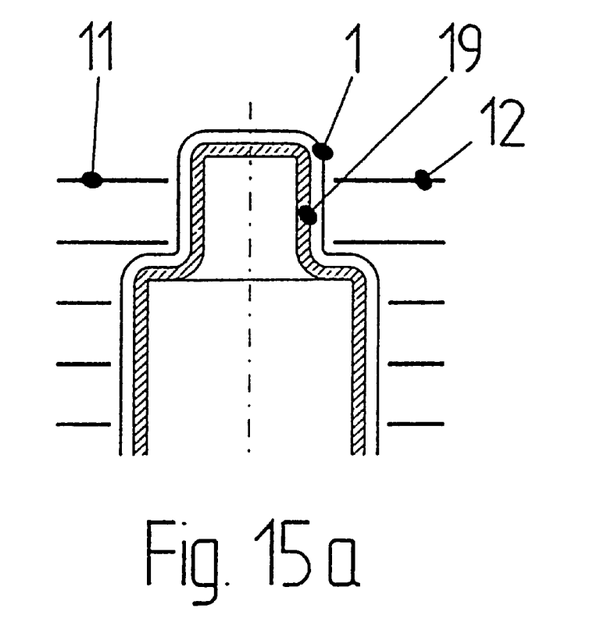
FIGS. 15a–c show a stepped hollow body as shaping body and the folds of the airbag which can be achieved thereby.
Figure 15B:
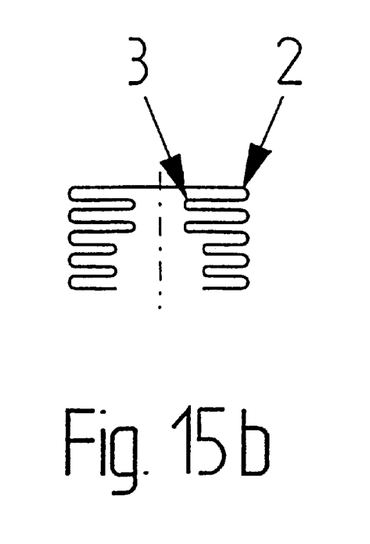
Figure 15C:
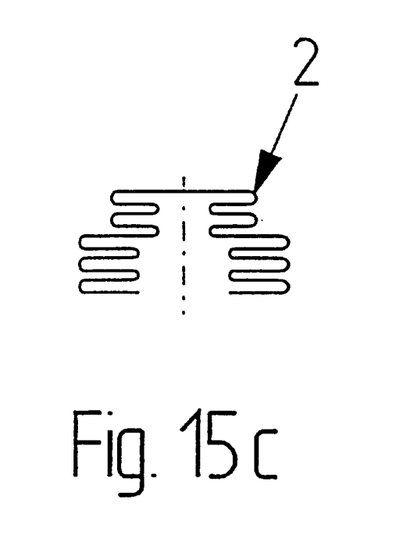

With the embodiment of FIG. 15a a stepped hollow cylinder 19 is provided as the shaping body. The airbag 1 which is to be folded is mounted over this and is enclosed by folding plates 11,12 in the manner previously described. For a folding of the airbag as shown in FIG. 15b where the path of the outer main folds 4 lies on a cylinder sleeve, a larger distance between the folding plates is required in the upper area with smaller diameter of the inner main folds 3. For a folding of the airbag shown in FIG. 15c by means of the stepped hollow cylinder 19 where the outer main folds 4 have a smaller diameter in the area of the smaller cylinder diameter of the shaping body the distance between the folding plates is equal size.

Figure 16:
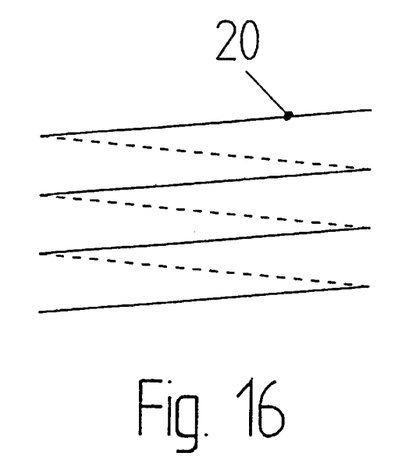
FIG. 16 shows an airbag packet with circumferential main folds in a side view.
Figure 17:
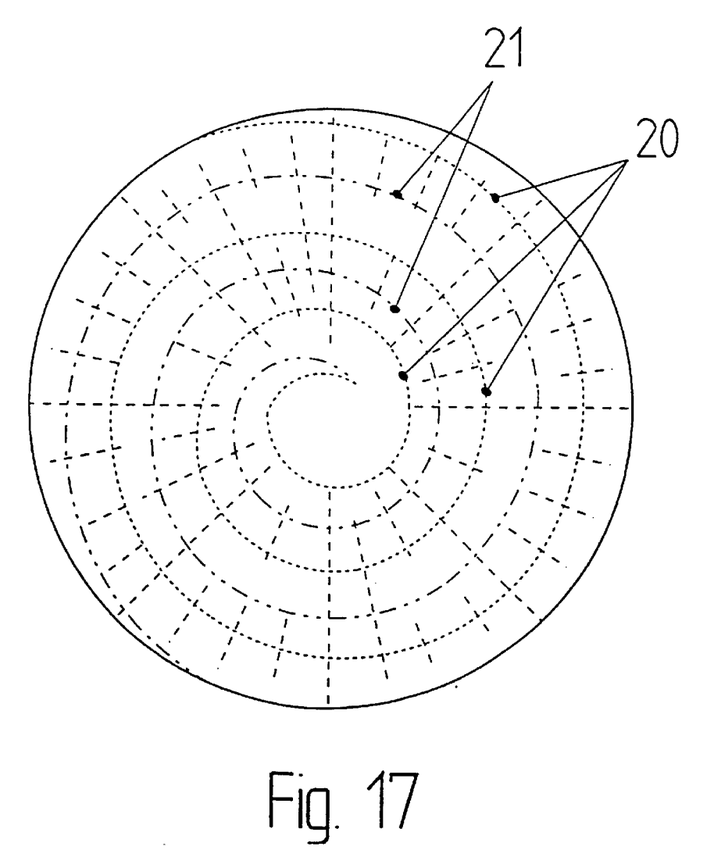
FIG. 17 shows the airbag according to FIG. 18 in plan view on the expanded top plate.

In the embodiment of FIGS. 16 and 17 instead of several inner and outer main folds only one outer main fold 20 and one inner main fold 21 is provided. These run spirally on an imaginary cylinder sleeve as shown in FIG. 16. From the illustrations in FIG. 17 with the plan view of the spread out airbag it is possible to see the main folds 20, 21 provided. It can be seen that the inner and outer main folds 20, 21 run into each other at the ends.

Figure 18:
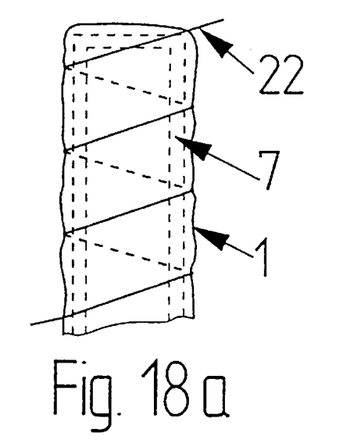

From FIGS. 18a and 18b can be seen diagrammatically the structure of a device for producing a folding according to FIG. 16. The empty airbag is fixed on the hollow cylinder 7 by means of a circumferential cable 22 at the point of the inner main fold 21 provided. The airbag is then pushed away from the hollow cylinder 7 by compressed air in the area of the outer main fold 20 provided and is compressed at the same time or afterwards.

The further processing steps correspond to that already described.

Figure 19:
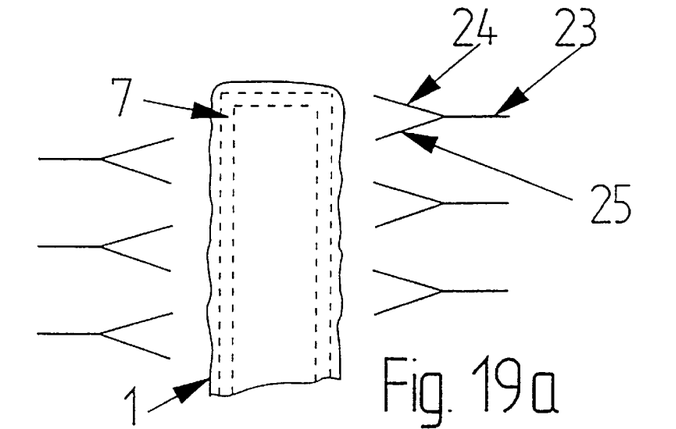
FIGS. 19a–c show a device for folding according to FIG. 18 by means of folding plates.

A further possibility for producing a folding with an inner and outer main fold line can be seen in FIGS. 19a to c. The airbag 1 located on the hollow cylinder 7 is associated with the folding plates 23 whose forks have parts 24,25 restricted relative to each other. The forks of the folding plates are restricted so that a spiral circumferential abutment of the airbag against the shaping body is produced (FIG. 19b). The restricted forks must be movable so that the restriction decreases during compression of the airbag (FIG. 19c).

What is claimed is:

1. A method for folding an airbag such that when the airbag is in a folded state, the airbag has at least one inner main fold and at least one corresponding outer main fold, wherein the at least one outer main fold is a greater distance from a longitudinal axis of the airbag than the at least one inner main fold, the method comprising the steps of:

clamping the airbag to a working surface;
   pre-shaping the airbag so that it extends along the longitudinal axis by inserting a shaping body into the airbag ugh an inflation opening, then
   fixing the airbag in the area of the at least one inner main fold;
   expanding the airbag to form the at least one outer main fold; and
   compressing the airbag in the direction of the clamping point.

2. The method according to claim 1 wherein the airbag comprises an inflation opening, the airbag is tensioned around the inflation opening, and the longitudinal axis runs approximately perpendicular through the inflation opening.

3. The method according to claim 2 wherein the expanding step comprises filling the airbag with compressed air and wherein the inner main fold is fixed by mechanical means.

4. The method according to claim 3 wherein the shaping body comprises a hollow cylinder, wherein the shaping body is inserted into inflation body and the airbag is tensioned over the hollow cylinder until it adjoins the same and is completely stretched,
   wherein the fixing step further comprises placing folding elements against the airbag to retain the airbag against the shaping body,
   wherein the expanding step comprises biasing the hollow cylinder upward with compressed air through the inflation opening,
   wherein the compressing step comprises compressing the hollow cylinder with the folding elements towards the working surface wherein the compressed air can escape through the inflation opening, and
   wherein the method further comprises removing the folding elements and hollow cylinder from the airbag and fitting the airbag with a cover cap and a generator.

5. The method according to claim 1 wherein the shaping body is cylindrical.

6. The method according to claim 1 wherein the shaping body has an outer surface and wherein the fixing step comprises retaining the airbag against the outer surface of the shaping body.

7. The method according to claim 6 wherein the expanding step comprises filling the airbag with air through the inflation opening.

8. The method according to claim 7 wherein the compressing step further comprises compressing the shaping body toward the working surface while the airbag is retained against the outer surface of the shaping body to expel the air within the airbag through the inflation opening.

9. The method according to claim 7 wherein the shaping body comprises a hollow interior and a plurality of openings extending from the hollow interior to the outer surface of the shaping body, and wherein the filling step comprises filling the interior of the shaping body with compressed air so that the air will flow through the plurality of openings and into the airbag.

10. The method of claim 1 wherein the airbag in its shaped and extended form is substantially radially arranged around the longitudinal axis.

11. The method of claim 1 wherein the airbag is clamped, shaped, fixed, and expanded in its unfolded configuration, such that the expansion step first forms the at least one outer main fold and the compressing step completes formation of the outer and inner main folds.

12. The method of claim 1 wherein the at least one inner main fold and at least one outer main fold are formed from a single layer of the airbag.

13. The method of claim 1 wherein the shaping body is air.

* * * * *